US011027831B2

(12) United States Patent
Pounds

(10) Patent No.: US 11,027,831 B2
(45) Date of Patent: Jun. 8, 2021

(54) SAFETY ROTOR

(71) Applicant: THE UNIVERSITY OF QUEENSLAND, St Lucia (AU)

(72) Inventor: Pauline Edith Iyan Pounds, St Lucia (AU)

(73) Assignee: The University of Queensland, St Lucia (AU)

( * ) Notice: Subject to any disclaimer, the term of this patent is extended or adjusted under 35 U.S.C. 154(b) by 343 days.

(21) Appl. No.: 16/315,431

(22) PCT Filed: Jul. 8, 2016

(86) PCT No.: PCT/AU2016/050597
§ 371 (c)(1),
(2) Date: Jan. 4, 2019

(87) PCT Pub. No.: WO2017/008107
PCT Pub. Date: Jan. 19, 2017

(65) Prior Publication Data
US 2019/0217948 A1 Jul. 18, 2019

(30) Foreign Application Priority Data
Jul. 10, 2015 (AU) ............................. 2015902735

(51) Int. Cl.
*B64C 27/00* (2006.01)
*A63H 27/00* (2006.01)
(Continued)

(52) U.S. Cl.
CPC ........... *B64C 27/006* (2013.01); *A63H 27/12* (2013.01); *B64C 11/00* (2013.01); *B64C 39/024* (2013.01);
(Continued)

(58) Field of Classification Search
CPC ........ B64C 27/006; B64C 27/20; B64C 11/00
See application file for complete search history.

(56) References Cited

U.S. PATENT DOCUMENTS 3,261,544 A 7/1966 Guichard
3,417,729 A * 12/1968 Gilday ................. B64C 27/006
116/203
(Continued)

FOREIGN PATENT DOCUMENTS

DE 10 2005 028 736 12/2006

OTHER PUBLICATIONS

International Preliminary Report on Patentability issued in PCT/AU2016/050597 dated Jan. 8, 2019.
(Continued)

*Primary Examiner* — Christopher D Hutchens
(74) *Attorney, Agent, or Firm* — Nixon & Vanderhye P.C.

(57) ABSTRACT

A safety rotor system for an aircraft including a flight rotor that is rotationally driven by a drive, the system including: a safety rotor that is rotationally driven during rotation of the flight rotor, the safety rotor including one or more safety members traversing a path outward of the flight rotor so that an object approaching the flight rotor through the path contacts one of the safety members before contacting the flight rotor, wherein the safety rotor decelerates when one of the safety members contacts an object; a sensor for detecting rotation of the safety rotor; and a controller configured to: determine, using the sensor, a deceleration of the safety rotor corresponding to one of the safety members contacting an object; and cause the rotation of the flight rotor to cease in response to detecting the deceleration of the safety rotor.

20 Claims, 7 Drawing Sheets

(51) Int. Cl.
 *B64C 11/00* (2006.01)
 *B64C 39/02* (2006.01)
(52) U.S. Cl.
 CPC .. *B64C 2201/027* (2013.01); *B64C 2201/042* (2013.01)

(56) References Cited

U.S. PATENT DOCUMENTS

| | | | |
|---|---|---|---|
| 5,190,242 A * | 3/1993 | Nichols | A63H 27/12 244/12.2 |
| 2003/0085320 A1 | 5/2003 | Rehkemper et al. | |
| 2014/0034776 A1 | 2/2014 | Hutson | |
| 2014/0323009 A1 | 10/2014 | Suzuki | |
| 2016/0280359 A1* | 9/2016 | Semke | B64C 27/10 |
| 2016/0280364 A1* | 9/2016 | Korhonen | B64C 27/006 |

OTHER PUBLICATIONS

International Search Report for PCT/AU2016/050597, dated Sep. 5, 2016, 5 pages.

* cited by examiner

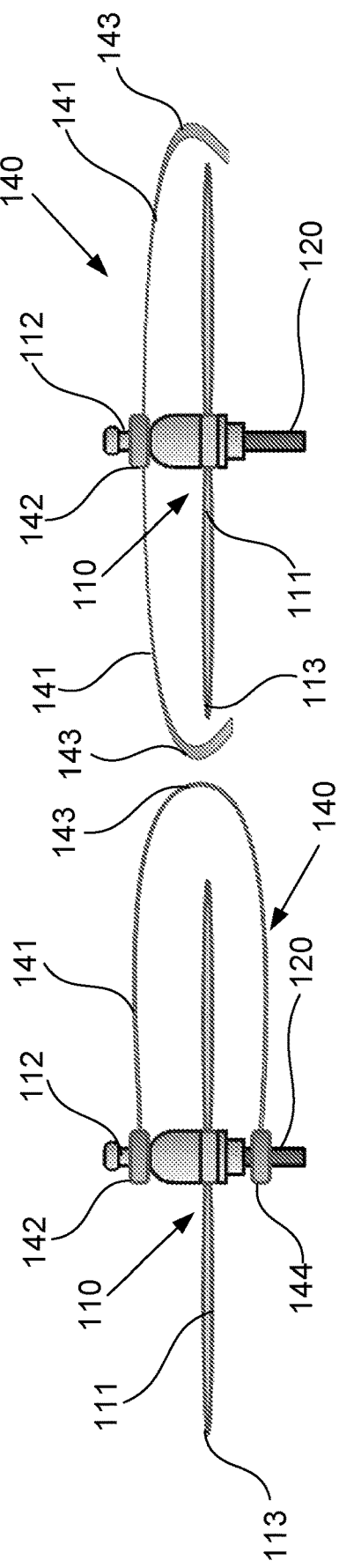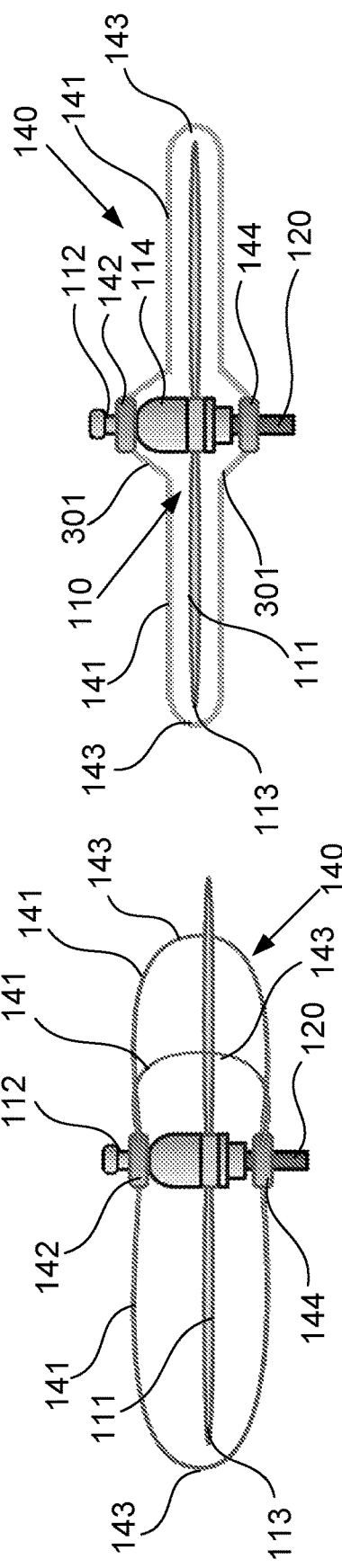

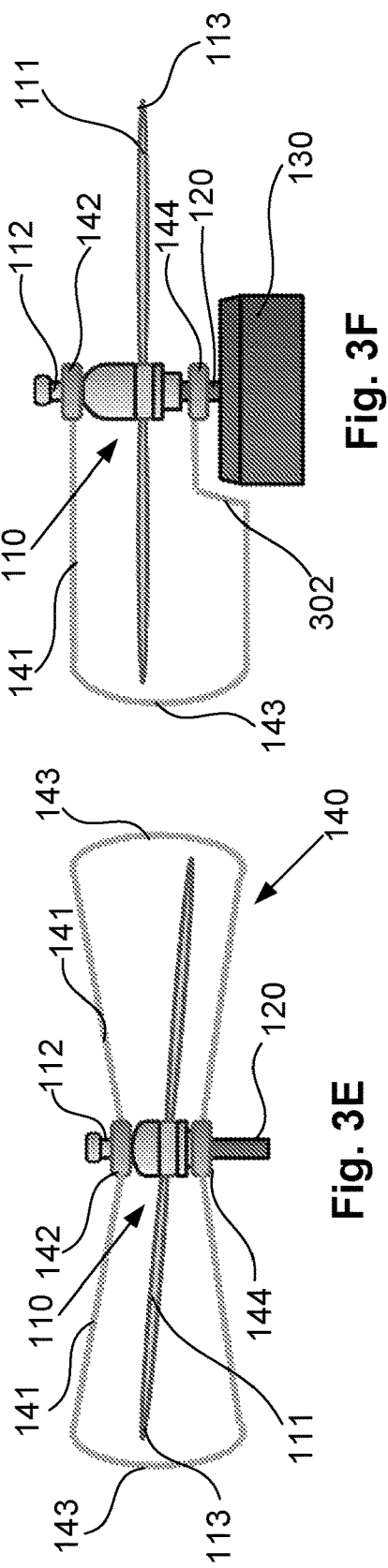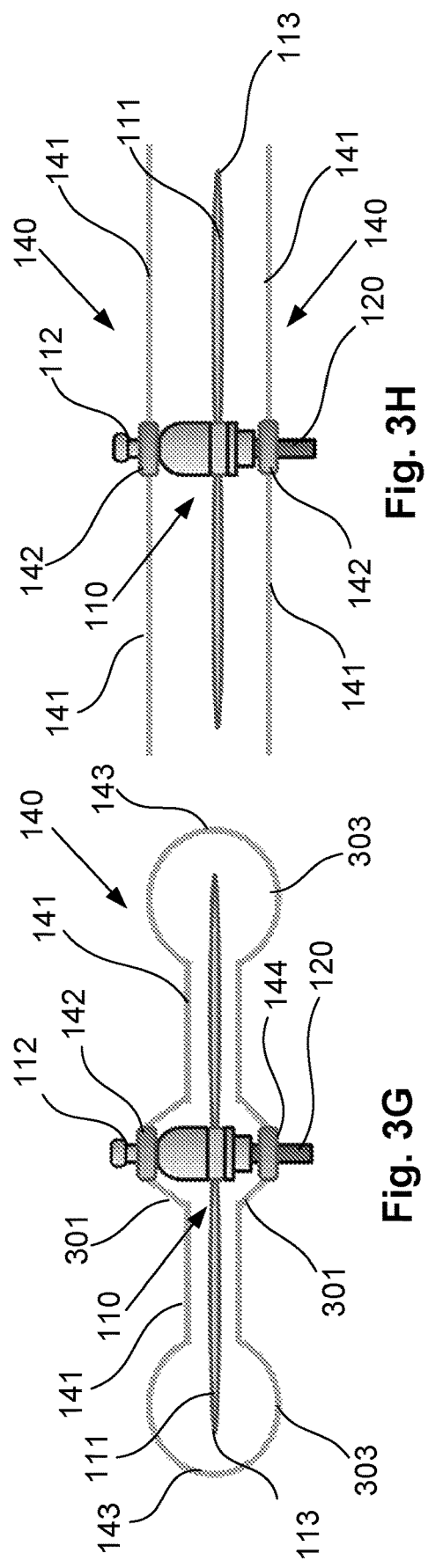

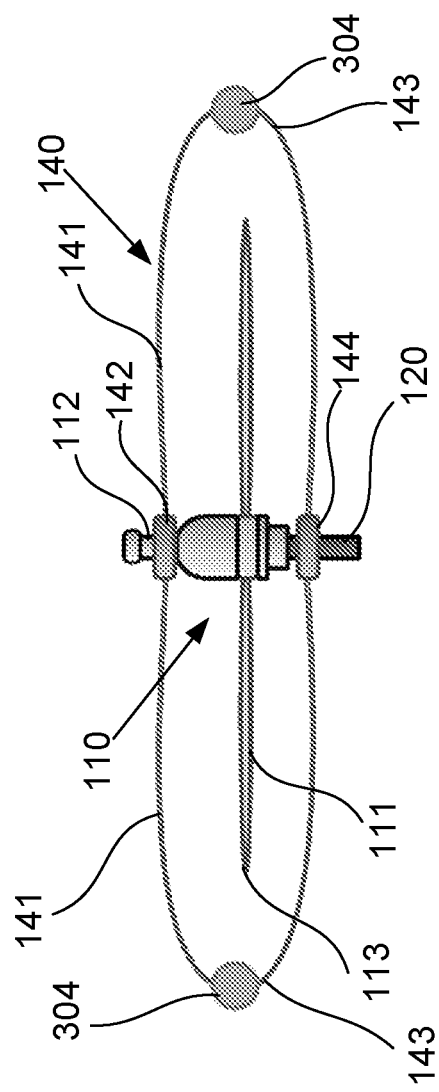
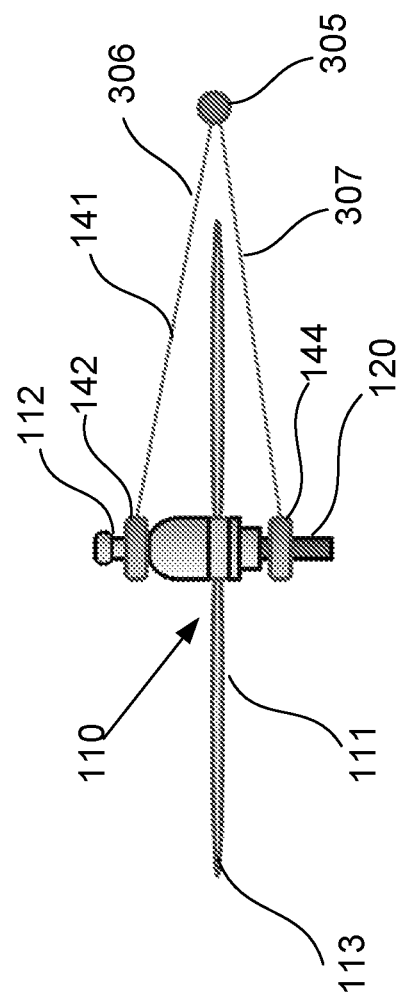
Fig. 3I
Fig. 3J

SAFETY ROTOR

This application is the U.S. national phase of International Application No. PCT/AU2016/050597 filed 8 Jul. 2016, which designated the U.S., the entire contents of which is hereby incorporated by reference.

BACKGROUND OF THE INVENTION

This invention relates to a safety rotor system for an aircraft.

DESCRIPTION OF THE PRIOR ART

Radio-controlled aircraft and unmanned aerial vehicles (UAVs), also commonly referred to as drones, are increasingly being adopted across a variety of civil and military applications. There has recently been a surge of interest in the use of remotely piloted or autonomous UAVs in recreational and commercial capacities, as these aircraft platforms become more affordable and easier to use.

Rotary-wing aircraft configurations including helicopters and particularly multi-rotor variants thereof such as quadrotors are especially desirable in many UAV applications, due to their flexible flight capabilities which allow vertical take off and landing, hovering, and stable flight in practically any direction. These capabilities make small rotary-wing aircraft especially suitable for operation indoors and/or in proximity to populated areas.

However, the proliferation of UAVs has led to a major issue in safety: the high-speed rotor blades and propellers of small rotary-wing aircraft can cause grievous injury or death, as well as damage to property. Furthermore, these aircraft are increasingly accessible to consumers and are often operated by people with little or no training, including children.

The conventional approach to addressing this safety issue is to install solid safety shrouds onto the aircraft to provide a physical barrier for preventing contact with its rotating blades or propellers. This commonly involves providing hoops of material surrounding the disc of rotation of the blades/propellers, mainly for preventing contact from radial directions. Mesh barriers may also be provided for preventing contact from axial directions although these may interfere with the airflow through the blades/propellers and not as commonly used. Some examples provide safety guards in the form of a cage structure surrounding the entire aircraft. However, fixed safety guards of these types can add significant weight to the aircraft, and substantially increase the size and structural complexity of the aircraft.

In view of the above, it is desirable to improve the safety of aircraft having exposed rotor blades or propellers, whilst reducing the weight penalty, size and structural complexity of previous solutions.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In a broad form the present invention seeks to provide a safety rotor system for an aircraft including a flight rotor that is rotationally driven by a drive, the system including:

a) a safety rotor that is rotationally driven during rotation of the flight rotor, the safety rotor including one or more safety members traversing a path outward of the flight rotor so that an object approaching the flight rotor through the path contacts one of the safety members before contacting the flight rotor, wherein the safety rotor decelerates when one of the safety members contacts an object;

b) a sensor for detecting rotation of the safety rotor; and, c) a controller configured to:

i) determine, using the sensor, a deceleration of the safety rotor corresponding to one of the safety members contacting an object; and, ii) cause the rotation of the flight rotor to cease in response to detecting the deceleration of the safety rotor.

Typically the path is radially outward of the flight rotor.

Typically the path defines a swept surface covering at least a portion of a rotor disc defined by the flight rotor so that an object passing through the swept surface contacts one of the safety members before contacting the flight rotor.

Typically each safety member is configured so that the swept surface covers at least one of:

a) a side of the rotor disc;

b) an edge of the rotor disc; and, c) both sides of the rotor disc.

Typically each safety member is configured so that the swept surface substantially encloses the rotor disc.

Typically the safety rotor is coupled to a shaft using a coupling that allows the safety rotor to be rotationally driven during rotation of the shaft, the coupling permitting the safety rotor to decelerate relative to the shaft when one of the safety members contacts an object.

Typically the flight rotor is mounted on the shaft, the shaft being rotationally driven by the drive.

Typically the shaft is rotationally driven by a safety rotor drive separate from the drive for driving the flight rotor and the flight rotor is mounted on a flight rotor shaft separate from the shaft to which the safety rotor is coupled, the flight rotor shaft being rotationally driven by the drive.

Typically the controller is configured to cause the safety rotor drive to rotate when the drive is driving the flight rotor shaft.

Typically the coupling allows the safety rotor to be rotationally driven by a frictional transmission of torque from the shaft and permits the safety rotor to slip relative to the shaft when one of the safety members contacts an object.

Typically the coupling includes a spring for biasing a safety rotor surface into engagement with a driven surface such that the frictional transmission of torque is increased due to spring pressure.

Typically the spring is mounted coaxially on the shaft, the spring being compressed between a hub of the safety rotor and the flight rotor, and the driven surface being a shoulder of the shaft.

Typically the safety rotor includes a hub for coupling the safety rotor to the shaft, each safety member being connected to the hub.

Typically each safety member extends radially from the hub beyond an edge of a rotor disc defined by the flight rotor.

Typically each safety member includes an outer portion extending at least partially around the edge of the rotor disc.

Typically the hub and the one or more safety members are formed integrally.

Typically the safety rotor includes a first hub for coupling the safety rotor to the shaft on a first side of the flight rotor and a second hub for coupling the safety rotor to the shaft on an opposing second side of the flight rotor, each safety member being connected to the first hub and the second hub.

Typically one of the hubs is used to rotationally drive the safety rotor during rotation of the shaft and the other one of the hubs is rotationally decoupled from the shaft.

Typically each safety member defines a closed loop extending around the rotor disc between the first hub and the second hub.

Typically each safety member is configured to maintain a minimum clearance distance between the loop and the rotor disc during rotation of the shaft.

Typically the drive is an electric motor and the controller is configured to cause the electric motor to apply electrodynamic braking to the shaft in response to detecting the decrease in rotational velocity of the safety rotor.

Typically the system includes a braking device coupled to the shaft and the controller is configured to cause the braking device to apply a braking force to the shaft in response to detecting the decrease in rotational velocity of the safety rotor.

Typically each safety member is sufficiently rigid so that a shape of the safety member at rest is substantially maintained during rotation.

Typically each safety member is flexible so that the safety member adopts a different shape during rotation compared to a shape of the safety member at rest.

Typically the sensor includes at least one of:
a) an optical sensor;
b) an electromagnetic sensor;
c) a capacitive sensor; and,
d) a strain sensor.

Typically at least one of the safety members includes a trigger element for triggering the sensor each time the safety member moves past the sensor during rotation.

Typically the controller is integrated with a processing device of the aircraft that controls operation of the drive.

BRIEF DESCRIPTION OF THE DRAWINGS

An example of the present invention will now be described with reference to the accompanying drawings, in which:

FIGS. 3A to 3J are examples of alternative configurations of safety members for use with the safety rotor system of FIG. 1A;

DETAILED DESCRIPTION OF THE PREFERRED EMBODIMENTS

Figure 1A:
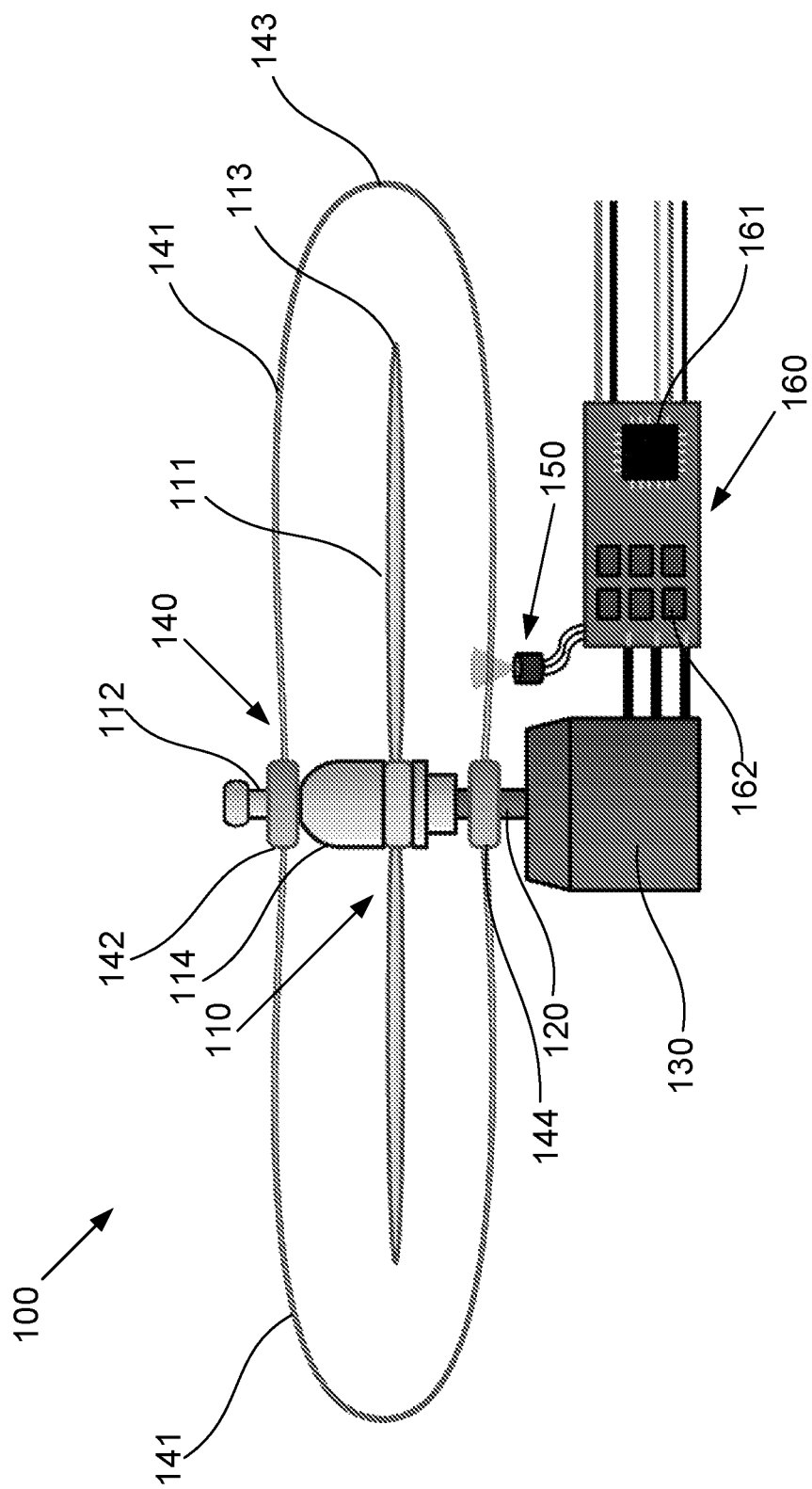
FIG. 1A is a side view of an example of a safety rotor system for an aircraft.

An example of a safety rotor system 100 for an aircraft will now be described with reference to FIGS. 1A and 1B.

As a preliminary note, it should be understood that the safety rotor system 100 may be applied to any form of aircraft that includes at least one flight rotor 110 that is rotationally driven by a drive 130. For example, the aircraft may be a rotary-wing aircraft such that the flight rotor 110 refers to a helicopter rotor (including a main rotor for generating lift or a tail rotor for countering torque generated by the main rotor in a single rotor helicopter), or the aircraft may be a fixed-wing aircraft such that the flight rotor 110 refers to a propeller. It should therefore be appreciated that the terms rotor and propeller may be used interchangeably in relation to the flight rotor 110 of the safety rotor system 100.

The safety rotor system 100 includes a safety rotor 140 that is rotationally driven during rotation of the flight rotor 110 and includes one or more safety members 141 that traverse a path outward of the flight rotor 110 so that an object approaching the flight rotor 110 through the path contacts one of the safety members 141 before contacting the flight rotor 110. In the example of FIGS. 1A and 1B, two safety members 141 are provided, although it will be appreciated that only a single safety member 141 may be used as shown in FIG. 3A, or three or more safety members 141 may be used as shown in FIG. 3C.

Although the safety rotor 140 is rotationally driven during rotation of the flight rotor 110, the system 100 is configured so that the safety rotor 140 decelerates when one of the safety members 141 contacts an object. Accordingly, the safety rotor 140 will be rotationally driven when the flight rotor 110 is rotationally driven by the drive 130, provided none of the safety members 141 have encountered an object. It is noted that the rotational velocity of the safety rotor 140 will not necessarily be equal to that of the flight rotor 110, and it may in fact be desirable to ensure that the safety rotor 140 maintains a slower rotational velocity compared to that of the flight rotor 110, to enhance the safety of the system 100 as will be explained in further detail in due course.

The system 100 also includes a sensor 150 for detecting rotation of the safety rotor 140, together with a controller 160. The controller 160 is configured to determine, using the sensor 150, a deceleration of the safety rotor 140 corresponding to one of the safety members 141 contacting an object and then cause the rotation of the flight rotor 110 to cease in response to detecting the deceleration of the safety rotor 140. For instance, the rotation of the flight rotor 110 may be ceased by causing the drive 130 to cease operation, by disengaging the drive 130 from the flight rotor 110, or by applying a braking force to a shaft 120 upon which the flight rotor 110 is mounted.

Accordingly, it will be understood that the system 100 can provide a capability for detecting when an object is about to come into contact with the flight rotor 110 and safely stopping the flight rotor 110 before contact with the flight rotor 110 can actually occur. The safety members 141 will preferably be configured to make initial contact with any object approaching hazardous exposed areas of a rotor disc defined by the flight rotor 110 during its rotation and trigger the controller 160 to cease rotation of the flight rotor 110 when the resulting deceleration of the safety rotor 140 indicates an imminent collision with the flight rotor 110. In other words, when one of the safety members 141 intercepts an approaching object, the system 100 detects the resulting deceleration of the safety rotor 140 and responds by initiating safety functionalities for stopping the flight rotor 110, thereby helping to protect the flight rotor 110 and/or the object from damage.

In view of the above described functionality, it will be appreciated that the safety members 141 should be constructed in a manner that presents a significantly reduced risk of damage to an object in the event of a collision, compared to that presented by the blades 111 of the flight rotor 110. For instance, the safety member 141 will preferably be formed without sharp edges and may be formed from a resilient material that allows elastic deformation of the safety member 141 upon impact with an object.

In addition, the safety rotor 140 and particularly its safety members 141 will preferably have a lightweight construction to reduce the energy transferred to an object in a collision and to also minimise the weight penalty associated with installing the safety rotor system 100 on the aircraft. It will be appreciated that the ability for the safety rotor 140 to slip relative to the shaft 120 will also significantly reduce the energy transferred to the object in a collision.

The safety rotor 140 may be coupled to a shaft 120 using a coupling that allows the safety rotor 140 to be rotationally driven during rotation of the shaft 120. The coupling may be configured to permit the safety rotor 140 to decelerate relative to the shaft 120 when one of the safety members 141 contacts an object.

It will be appreciated that references to the shaft 120 are intended to broadly apply to any structure for the transmission of rotational energy to the safety rotor 140. For example, the shaft 120 may be in the form of an elongate rigid rotating member, a tube or a hollow cylindrical body, although the structure of the shaft 120 may take other forms whilst allowing the above described functionality. References to a shaft 120 may also apply to other rotating structures mounted upon a rotating body, such as a spindle 112 as shown in FIG. 1A, which may operate in unison with an underlying shaft 120 to provide an effective shaft assembly.

In some examples, the flight rotor 110 may be mounted on the same shaft 120 to which the safety rotor 140 is coupled, such that the shaft 120 is rotationally driven by the drive 130 for driving the flight rotor 110. Accordingly, the safety rotor 110 may be mechanically coupled to the shaft 120 upon which the flight rotor 110. It will be appreciated that such an arrangement is shown in the example system 100 depicted in FIG. 1A.

However, in alternative examples, the shaft 120 may be driven by a safety rotor drive (not shown) that is separate from the drive 130 for driving the flight rotor 110, and the flight rotor 110 may be mounted on a flight rotor shaft (not shown) that is separate from the shaft 120 to which the safety rotor 140 is coupled, such that the flight rotor shaft is rotationally driven by the drive 130 separately. It will be appreciated that this type of arrangement may be used to allow a single safety rotor 140 to enhance the safety of an aircraft including a plurality of flight rotors 110. In such examples, the controller 160 may be configured to cause the safety rotor drive to rotationally drive the safety rotor 140 when the drive 130 is driving the flight rotor shaft to rotationally drive the flight rotor 110.

In either case, the rotation of the flight rotor 110 may be ceased by ceasing the operation of the drive 130, and/or by ceasing rotation of the shaft 120 to which the flight rotor 110 is attached, such as by disengaging the drive 130 from the shaft 120 or applying a braking load to the shaft 120.

In some embodiments, the coupling may allow the safety rotor 140 to be rotationally driven by a frictional transmission of torque from the shaft 120 and permit the safety rotor 140 to slip relative to the shaft 120 when one of the safety members 141 contacts an object. The safety rotor 140 may thus rotate at a slower rotational velocity compared to that of the shaft 120 (and the flight rotor 110 in cases where this is mounted upon the same shaft 120) since the safety rotor 140 is not rigidly mounted on the shaft 120. In this example, the safety rotor 140 is permitted to slip relative to the shaft 120 so that the safety rotor 140 can decelerate or cease rotating entirely in the event that one of the safety members 141 comes into contact with an object, such as a body part of an individual or a surface.

However, it will be appreciated that the above mentioned functionality of allowing the safety rotor 140 to be rotationally driven during rotation of the shaft 120 but decelerate when one of the safety members 141 contacts an object can be achieved using other different configurations of the safety rotor 140 and/or other elements of the system 100.

For instance, the safety rotor 140 may be coupled to the same shaft 120 as the flight rotor 110 and may include an engaging member (not shown) that engages a part of the flight rotor 110 so that the safety rotor 140 rotates in unison with the flight rotor 110 during normal operation, but when one of the safety members 141 contacts an object the engaging member is permitted to disengage from the flight rotor 110, such as by undergoing elastic deformation, so that the safety rotor 140 can decelerate.

Alternatively, in another embodiment in which the safety rotor 140 is coupled to a rotationally driven shaft 120, the coupling may be configured to positively engage the safety rotor 140 to transmit torque within a predetermined torque range corresponding to the capability of the drive 130, but disengage the safety rotor 140 upon encountering a larger torque in the event of a contact with an object. The disengagement of the coupling may require physical intervention by a user in order to reset the system 100.

As mentioned above, it may also be desirable to have the safety rotor 140 rotate at a rotational velocity that is significantly slower than the rotational velocity of the flight rotor 110. This can help to ensure that contact between the safety members 141 and an object is likely to be significantly less damaging than contact between the flight rotor 110 and the object.

For instance, in the above discussed example in which the coupling allows the safety rotor 140 to be rotationally driven by a frictional transmission of torque from the shaft 120 and permits the safety rotor 140 to slip relative to the shaft 120, the slower rotational velocity of the safety rotor 140 can be facilitated through the design of the coupling between the safety rotor 140 and the shaft 120 to achieve a suitable balance of frictional torque transmission and slip between the safety rotor 140 and the shaft 120. Additionally or alternatively, the safety members 141 may be designed to induce a drag torque which counteracts the torque transmitted from the shaft to slow the rotation of the of the safety rotor 140.

In examples where the safety rotor 140 is rotationally driven by a separate safety rotor drive, the controller 150 may be configured to cause the safety rotor drive to drive the safety rotor 140 at a rotational velocity that is proportionally based on the rotational velocity of the main drive 130 that is driving the flight rotor 110.

It is also noted that the safety rotor 140 may have an additional safety effect associated with the safety members 141 contacting an approaching object before it is able to contact the flight rotor 110. In particular, if a body part of an individual such as a finger is brought into contact with one of the safety members 141, the individual may feel the impact and pull the body part away from the aircraft as a reflex reaction. In other words, the safety rotor 140 contacting the body part of the individual may act as a warning of imminent collision with the flight rotor 110 and cause the individual to take other actions to avoid the collision. It will be appreciated that this may be especially useful in deterring young children from touching the rotating blades 111 of the flight rotor 110 of small aircraft.

In any event, it will be appreciated that the system 100 can be used to substantially increase the safety of aircraft that achieve flight using exposed rotors or propellers, especially those operated in populated areas where there is an increased risk of damaging collisions with individuals. The system 100 is expected to be particularly advantageous in the growing recreational market for small remote-controlled hovering aircraft such as quadrotor drones.

Figure 1B:
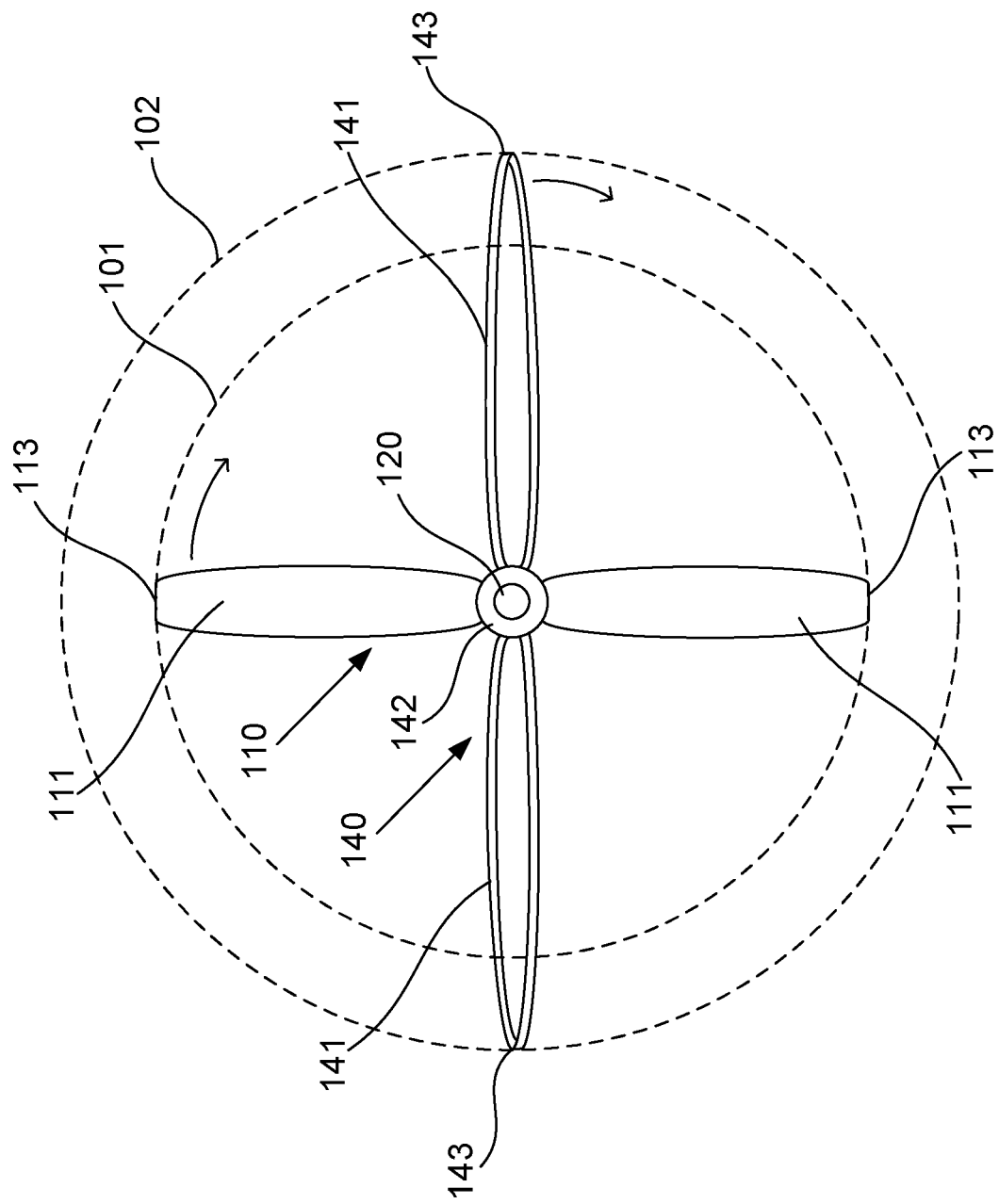
FIG. 1B is a schematic top view of a flight rotor and a safety rotor of the safety rotor system of FIG. 1A.
Figure 2:
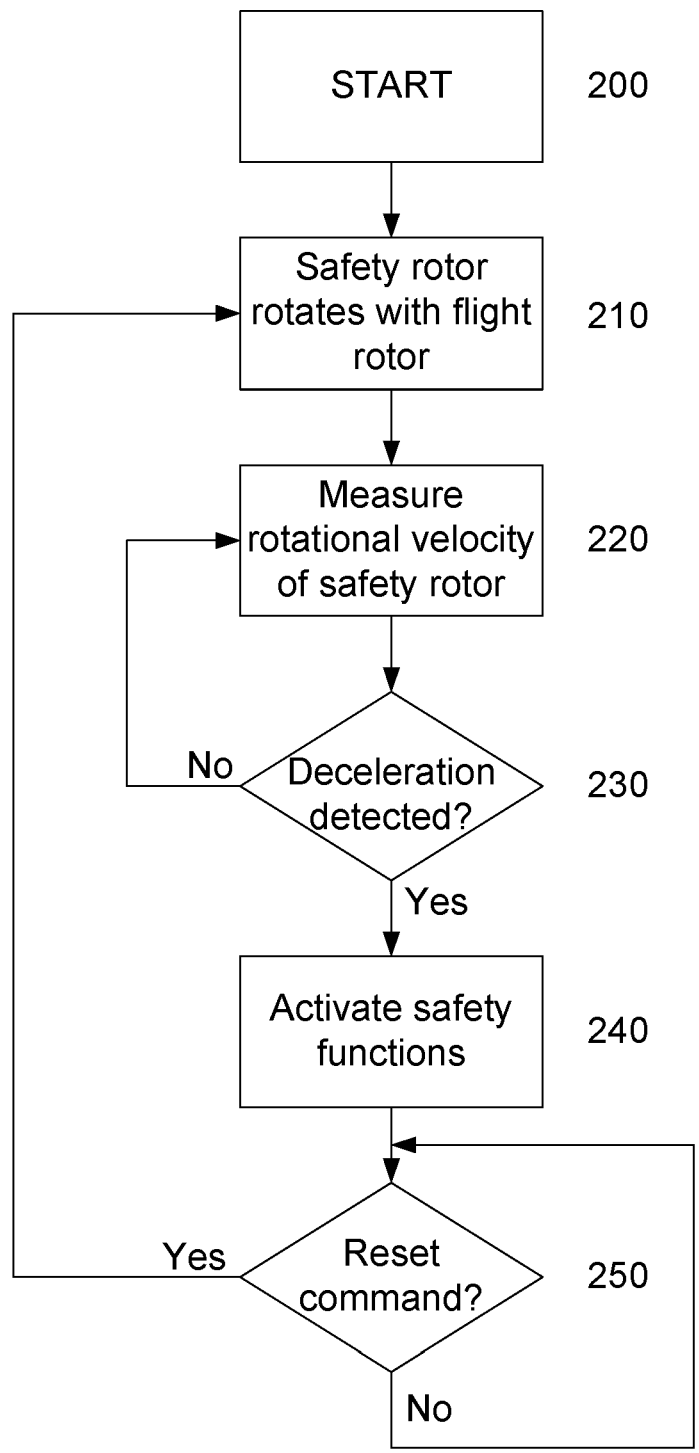
FIG. 2 is a flow chart of a method of operating the safety rotor system of FIG. 1A.

FIG. 2 depicts a flow chart representing a typical operational functionality of the system 100. To facilitate improved understanding of the operation of a practical embodiment of the system 100, this flow chart will be described with regard to the specific embodiment of the system 100 shown in FIGS. 1A and 1B, in which the safety rotor 140 is coupled to the same shaft 120 upon which the flight rotor 110 is mounted and which is driven by the drive 130. However, it should be understood that the steps of FIG. 2 will be equally applicable to alternative embodiments of the system which do not necessarily have the same configuration as shown in FIGS. 1A and 1B, examples of which were discussed above.

Operation of the system 100 starts at step 200 which, in the system 100 of FIGS. 1A and 1B, involves engaging the drive 130 to rotate the shaft 120 and in turn rotate the flight rotor 110 for use in flight of the aircraft. In step 210, the safety rotor 140 is rotationally driven along with the shaft 120, and will typically reach a rotational velocity that is less than but proportional to that of the flight rotor 110 that is mounted on the shaft 120.

The rotational velocity of the safety rotor 140 is measured in step 220, using the sensor 150. Suitable forms of the sensor 150 will be discussed in due course, although in one example the rotational velocity will be determined by having the sensor 150 generate a signal each time a safety member 141 passes by the sensor 150 as it revolves around the shaft 120, such that a period of time between subsequent signals is indicative of the rotational velocity of the safety rotor 140. The controller 160 will typically receive the signals generated by the sensor 150 and process these to continuously monitor the rotational velocity of the safety rotor 140.

The controller 160 monitors the measured rotational velocity to detect whether a deceleration in the rotational velocity of the safety rotor 140 has occurred. As long as the rotational velocity remains stable such that no significant deceleration is detected at step 230, the system 100 will allow the aircraft to operate normally whilst continuing to monitor the measured rotational velocity. However, if a decrease in the rotational velocity of the safety rotor 140 is detected at step 230, then the controller 160 will activate safety functions at step 240 to cause the rotation of the flight rotor 110 to cease.

It will be appreciated that the safety rotor 140 may decelerate during normal operation of the aircraft without necessarily indicating a collision with an object, such as when the rotational velocity of the flight rotor 110 is intentionally decreased during flight manoeuvers and the rotational velocity of the safety rotor 140 decreases accordingly (either due to mechanical coupling between the safety rotor 140 and the safety rotor 140 rotation or due to the controller 160 controlling the rotational velocity of the safety rotor 140 based on the rotational velocity of the flight rotor 110). The controller 160 may therefore be configured to ensure the safety functions are only activated in response to decreases in the rotational velocity that are more likely to correspond to a collision.

In one example, the controller 160 may be configured to only respond to a decrease in the rotational velocity of the safety rotor 140 that exceeds a predetermined threshold. For instance, whenever the shaft 120 and the flight rotor 110 decelerates under normal operation, the safety rotor 140 would also be expected to decelerate gradually, although in the event of a collision between the safety rotor 140 and an object the deceleration would be relatively large and sudden. Accordingly, the predetermined threshold used in determining whether to respond to a deceleration of the safety rotor 140 may be established to allow a deceleration corresponding to a collision to be distinguished from other decelerations that may be encountered during normal operation of the aircraft.

In another example, the controller 160 may be configured to monitor the respective rotational velocities of the safety rotor 140 and the shaft 120 and determine whether a deceleration of the safety rotor 140 is due to contact with an object based on the two rotational velocities. For instance, a shaft sensor (not shown) may be provided for detecting rotation of the shaft 120 (it will be appreciated that such a shaft sensor may already exist in some electric motor drives 130) and the relative difference between the rotational velocity of the safety rotor 140 and the rotational velocity of the shaft 120 can be monitored by the controller. If the shaft 120 decelerates during normal operation of the aircraft, the safety rotor 140 will undergo a corresponding deceleration which would not involve a significant relative difference between their respective rotational velocities. However, in the event of a collision between one of the safety members 141 and an object, the deceleration of the safety rotor 140 will be inconsistent with the rotation of the shaft 120 leading to a significant relative difference between their respective rotational velocities, allowing decelerations due to collisions to be readily distinguished from decelerations during normal operation.

In a further alternative example, the controller 160 may be integrated with other flight controls of the aircraft so that the controller 160 can compare a detected deceleration in the rotational velocity of the safety rotor 140 with control signals provided to the drive 130 during the flight of the aircraft. If a deceleration in the rotational velocity of the safety rotor 140 corresponds to a control signal for decelerating the drive 130, then this may be disregarded by the controller 160. On the other hand, if a deceleration in the rotational velocity of the safety rotor 140 was not expected based on the control signals provided to the drive 130, then this would be taken to indicate a collision with an object, causing the controller 160 to activate its safety functions.

The system 100 may optionally be configured so that normal operation of the aircraft can only resume when the controller 160 receives a reset command at 250, for example to require confirmation that the risk of collision with the object is no longer present. The reset command may be supplied as a user input via a remote control unit or the like, or may be based on other aircraft sensor inputs which indicate that the collision risk has passed. In any event, upon receipt of the reset command, the controller 160 will allow system to restart by having the drive 130 rotate the shaft 120 so that the flight rotor 110 and safety rotor 140 rotate once again as per steps 210 and 220.

Some examples may allow for remote arming and resetting of the safety rotor 140 triggering mechanism. For example, the aircraft may be allowed to start with the safety rotor system 100 disabled, so that the system needs to be armed before use. This could be achieved by having a user throw a switch on a radio control handset, or computer terminal (in wireless communication with the systems) to activate the system. As mentioned above, the system may also be reset manually in a similar manner, i.e. through handset or computer after activation of the safety functionalities.

Other examples may provide for automatic arming and resetting of safety rotor 140 triggering mechanism. For instance, system may be configured to determine when the safety rotor 140 is up to speed and ready to be armed without requiring any manual remote controlled input. Such an automatic system could also be configured to determine circumstances in which the aircraft has survived a close encounter and automatically rest the system to permit reactivation of the safety rotors 140.

As discussed above, the safety members 141 traverse a path outward of the flight rotor 110. In preferred embodiments, the path is radially outward of the flight rotor 110 which can provide improved protection about the tips 113 of the blades 111 of the flight rotor 110. Nevertheless, in some embodiments, the path may not extend radially outward of the flight rotor 110 and still provide a good degree of protection outward of the flight rotor 110.

The operation of the safety rotor 140 can be better understood by recognising that the path traversed by each safety member 141 defines a swept surface as the safety rotor 140 rotates. The swept surface covers at least a portion of a rotor disc defined by the flight rotor 110, so that an object passing through the swept surface contacts one of the safety members 141 before contacting the flight rotor 110.

The location of the swept surface relative to the rotor disc defined by the flight rotor 110 can be visualised in the side view of FIG. 1A, by considering the rotor disc as a disc with a cross section corresponding to the shape of the blades 111 of the flight rotor 110 and the swept surface as an axisymmetric surface with a cross section corresponding to the shape of the two safety members 141. The location of the swept surface relative to the rotor disc can also be visualised in the top view of FIG. 1B, in which the rotor disc edge 101 is represented as a circle inscribed by the tips 101 of the blades 111 of the flight rotor 110 and the outer perimeter 102 of the swept surface is represented as another circle inscribed by the outer portions 143 of the safety members 141, which is located outside the rotor disc edge 101 indicating that the swept surface extends radially beyond the rotor disc.

Whilst the swept surface does not actually provide a physical barrier for preventing objects from coming into contact with the flight rotor 110, it effectively defines the extent of safety protection afforded by the system 100 since the flight rotor 110 will be stopped by the safety functions of the controller 160 whenever an object impinges upon the swept surface.

As will be explained in further detail in due course, the safety members 141 may be provided in a range of different configurations which can achieve different degrees of coverage of the rotor disc defined by the flight rotor 110. For instance, the safety members 141 may be configured so that the swept surface covers any combination of one or both sides of the rotor disc and an edge of the rotor disc, depending on requirements.

In some examples, it may be desirable to configure the safety members 141 so that the swept surface substantially encloses the rotor disc, so as to provide safety protection for objects approaching the flight rotor 110 from practically any direction. It will be appreciated that this is the case in the embodiment depicted in FIGS. 1A and 1B.

In other examples, it may be sufficient to cover only one side of the rotor disc to only provide safety protection for objects approaching the flight rotor 110 from that side, and the safety members 141 will be configured accordingly. Typically, this involves configuring the safety members 141 so that they traverse a path defining a swept surface with a disc-like shape that is located adjacent to the rotor disc and will usually extend beyond the edge of the rotor disc.

Further details of preferred embodiments of the system 100 will now be discussed to provide examples of desirable and/or optional features.

Embodiments of the safety rotor 140 may include a hub 142 for coupling the safety rotor 140 to the shaft 120, with each safety member 141 being connected to the hub 142. In its simplest form, the hub 142 includes a hole for receiving the shaft 120 and thus providing a bearing for the safety rotor 140. It should be noted, however, that the hub 142 may be coupled to an intermediate structure mounted on the shaft 120. For example, in the embodiment shown in FIGS. 1A and 1B, the hub 142 is mounted on a spindle 112 provided as part of the assembly flight rotor 110. Nevertheless, the hub 142 is effectively coupled to the shaft 120, via the spindle 112.

The safety rotor 140 may be rotationally driven due to a frictional transmission of torque from the shaft 120 to the hub 142, via the spindle 112. The frictional transmission of torque to the hub 142 (from the shaft 120, spindle 112 or any other intermediate structure to which the hub 142 is mounted) can be regulated in a range of different ways. In some examples, the size of the hole can be specified to provide a suitable fit for the transmission of torque whilst permitting a desirable amount of slip. In other examples, frictional elements may be provided in the hole of the hub 142 to provide increased friction in the bearing and thus increase the rate of rotation of the safety rotor 140. Alternatively or additionally, frictional elements may be provided on the mounting surface of the shaft 120 or spindle 112 to provide a similar effect.

In some examples, the safety rotor 140 may be mounted on the shaft 120 or spindle 112 along with a spring (not shown) which may be used to bias the hub 142 towards a driven surface of the shaft 120. Thus, the safety rotor surface will be frictionally engaged with the driven surface and the frictional transmission of torque will be increased due to spring pressure.

On the other hand, it may be desirable to increase the ability of the safety rotor 140 to slip relative to the shaft and therefore the hub 142 may be provided with one or more low-friction bushes, bearings, lubricants or treatments to reduce the transfer of torque from the shaft 120 to the safety rotor 140 and thus slow the rate of rotation of the safety rotor 140 and/or increase its contact sensitivity.

However, as mentioned above, alternative techniques may be used to allow the safety rotor 140 to be rotationally driven during rotation of the shaft 120 yet permit deceleration of the safety rotor 140 relative to the shaft 120 when one of the safety members 141 contacts an object.

Each safety member 141 will preferably be configured to extend radially from the hub 142 beyond an edge of the rotor disc defined by flight rotor 110. In other words, the safety members 141 should define a larger radius than tips 113 of the blades 111 of the flight rotor 110, as can be seen in FIG. 1B by comparing the rotor disc edge 101 inscribed by the tips 113 of the blades to the outer perimeter 102 of the swept surface traversed by the safety members 141. However, this might not be necessary if the safety rotor 140 is used on an aircraft already including physical safety shrouds such as hoops surrounding the edge of the rotor disc.

In some examples, each of the safety members 141 may include an outer portion 143 extending at least partially around the edge of the rotor disc (i.e. around the tips 113 of the blades 111). This configuration can help to ensure suitable safety protection is provided from a range of approach angles relative to the rotor disc, and particularly from the edges. It should be appreciated that the configuration shown in FIGS. 1A and 1B is merely an illustrative example of a safety member 141, although a range of different designs are possible as will be discussed in due course with reference to FIGS. 3A to 3J.

Each safety member 141 may be cantilevered from the hub 142 as shown in FIGS. 1A and 1B. This can help to ensure that the safety members 141 extend from the shaft 120 at a suitable angle relative to the rotor disc in use. In some specific examples the safety members 141 may be cantilevered with additional supports being provided between the safety members 141 and the hub 142 to provide further rigidity to the connection. However, it should be understood that a cantilevered connection between the safety members 141 and the hub 142 is not essential and in some alternative examples the safety members may be simply supported using a pinned connection to the hub 142, or the like. In these cases, the centripetal force of rotation of the safety rotor 140 may be used to ensure the correct positioning of the safety members 141 relative to the rotor disc.

In preferred embodiments, the hub 142 and the safety members 141 may be formed integrally as shown in FIGS. 1A and 1B. For instance, the hub 142 and the safety members 141 may be constructed as a single moulded plastic part. This can enable efficient manufacture of the safety rotor 140 along with lightweight construction which is of course highly desirable for aircraft equipment. However, in some examples, the safety rotor 140 may be formed as an assembly of separate components, for instance by having the hub 142 formed from a first material and the safety members 141 formed from a second material, and attached to the hub 142. In other examples, the hub 142 may include a separate bearing component such as a boss or the like.

In the example of FIGS. 1A and 1B, the safety rotor 140 includes two hubs 142, 144. In particular, the safety rotor 140 includes a first hub 142 for coupling the safety rotor 140 to the shaft 120 on a first side of the rotor disc defined by the flight rotor 110, and a second hub 144 for coupling the safety rotor 140 to the shaft 120 on an opposing second side of the rotor disc defined by the flight rotor 110. Each safety member 141 is connected to both the first hub 142 and the second hub 144.

In embodiments including two hubs 142, 144 as discussed above, each safety member 141 may define a closed loop extending around the rotor disc between the first hub 142 and the second hub 144. It will be appreciated that such a closed loop arrangement can ensure that the safety members 141 traverse a swept surface that completely encloses the rotor disc, thus offering safety protection for objects approaching the flight rotor 110 from practically any approach vector.

Each of the looped safety members 141 will preferably be configured to maintain a minimum clearance distance between the loop of the safety member 141 and the rotor disc during rotation of the shaft 120. This can ensure that the system 100 can respond to an object approaching the flight rotor 110 from any approach vector with a similar likelihood of responding by ceasing rotation of the shaft 120 before contact with the flight rotor 110 can occur. However, in some examples, it may be desirable to vary the clearance distance for different portions of the safety members 141, as will be discussed in due course with regard to alternative embodiments of the safety rotor 140.

The respective hubs 142, 144 may have different functionalities, and in some examples only one of the hubs 142, 144 may be used to rotationally drive the safety rotor 140 during rotation of the shaft 120. In the embodiment of FIGS. 1A and 1B, the first hub 142 is used to rotationally drive the safety rotor 140 by frictionally transmitting torque from the shaft 120 to the safety rotor 140, whilst the second hub 144 is rotationally decoupled from the shaft 120 and hence allowed to spin freely relative to the shaft 120. Accordingly, the second hub 144 might only provide the functionality of radially constraining the ends of the safety members 141 where these are connected to the second hub 144. The second hub 144 may therefore be made without having to meet the same requirements regarding frictional torque transfer and slip as the first hub 142, and may thus be subject to looser tolerances or may use a different design.

The safety members 141 may be constructed as substantially rigid or flexible elements depending on requirements. For instance, the safety members 141 can be substantially rigid so that a shape of each safety member 141 at rest is substantially maintained during rotation. This can help to ensure that the safety members 141 are suitably arranged relative to the flight rotor 110 at different rotational speeds, but may involve additional weight and might also present a higher risk of damage when the safety members 141 collide with objects. On the other hand, the safety members 141 can be flexible so that each safety member 141 adopts a different shape during rotation compared to a shape of the safety member 141 at rest. This can facilitate more lightweight designs compared to those with rigid safety members 141 and can also allow for resilient safety members 141 which can elastically deform with minimal transfer of energy to an object in the event of a collision. However, a downside to the use of flexible safety members 141 is that these may interfere with the flight rotor 110 at lower speeds or may offer varying degrees of protection depending on the shape adopted during rotation at different speeds.

As mentioned above, a range of different design configurations may be used to provide the safety rotor 140, and further illustrative examples will now be discussed with regard to FIGS. 3A to 3J. It should be understood that these examples are not exhaustive.

The example of FIG. 3A shows an example in which a single looped safety member 141 is provided, in contrast to the previous example of FIGS. 1A and 1B which shows two looped safety members 141 extending between two hubs 142, 144. This example is able to provide a safety rotor 140 with safety functionality similar to that of the previous example but with further reduced weight.

FIG. 3B shows an example of a safety rotor 140 including two safety members 141 which do not form loops around the flight rotor 110 but instead extend from a single hub 142 with outer portions 143 at their distal ends which extend at least partially around tips 113 of the blades 111 of the flight rotor 110. Although an underside of the flight rotor 110 will be exposed in this arrangement, the safety members 141 can provide good safety protection of the upper side of the flight rotor 110 and tips 113 of its blades 111 without requiring the additional weight and complexity of a second hub 144 as per the previous examples.

In FIG. 3C, the safety rotor 140 includes three looped safety members 141 extending between two hubs 142, 144. The three safety members 141 are preferably arranged in an even distribution around the hubs 142, 144 to provide a balanced configuration. It is noted that any number of safety members 141 may be provided in the safety rotor 140. Whilst additional safety members 141 will increase the responsiveness of the safety rotor 140 to approaching objects by increasing the likelihood of a collision between the object and one of the safety members 141, each additional safety member 141 will introduce an associated weight penalty, which will tend to impose practical limitations on the number of safety members 141 provided on the safety rotor 140.

FIG. 3D shows an example of a safety rotor 140 including two looped safety members 141 which are shaped to maintain a relatively close spacing from the rotor disc defined by the flight rotor 110. In this example, the safety members 141 include bulges 301 which expand around the spinner assembly 114 of the flight rotor 110. Other related examples may include safety members 141 with other adaptations to their shape to accommodate different features of the flight rotor 110 whilst maintaining a desired separation from its blades 111.

For instance, in FIG. 3E, the safety rotor 140 includes two looped safety members 141 that are specifically shaped for accommodating flexing blades 111 of the flight rotor 110. The safety members 141 may each have a loop that expands with radial distance from the shaft 120 and have a broad outer portion 143 to account for the full range of motion of the tips 113 of the blades 111 as the blades flex 111. Accordingly, this design can prevent the safety members 141 from colliding with an articulated or flexible flapping flight rotor 110.

In the example of FIG. 3F, the safety rotor 140 includes a single looped safety member 141 which is shaped to avoid the drive 130 by including a recess 302 adjacent to the second hub 144. This configuration can allow the safety member 141 to maintain a relatively large spacing from the rotor disc defined by the flight rotor 110, but without colliding with the structure of the drive 130. Other related examples may include safety members 141 specifically shaped to prevent the safety members 141 from colliding with other structures of the aircraft.

FIG. 3G shows an example in which the safety members 141 have variable clearance from different parts of the rotor disc. In this case, the safety rotor 140 includes two looped safety members 141 similar to those of FIG. 3D, but with their outer portions 143 including expansions 303 around the edge of the rotor disc defined by the flight rotor 110. These expansions 303 allow a greater separation from the tips 113 of the blades 111, and effectively increase the safety protection with respect to objects approaching the edge of the rotor disc compared to objects approaching the sides of the rotor disc. This can help to account for the increased hazard of damage or injury associated with high tip speeds.

In the example of FIG. 3H, two separate safety rotors 140 are provided with respective hubs 142 mounted on either side of the flight rotor 110. Each safety rotor 140 includes two safety members 141 which extend radially from the respective hub 142 beyond the tips 113 of the blades 111 for traversing disc-shaped geometric surfaces covering either side of the flight rotor 110. Although these types of safety members 141 do not strictly prevent objects from contacting the tips 113 of the blades, in practice the safety members 141 will still afford good protection particularly if these are located in close proximity to rotor disc and extend beyond the tips 113 of the blades 111 by a suitable distance. Most objects and approach vectors should be intercepted excess for those having a size smaller than the gap between the safety rotors and an approach vector directing the objected radially inwardly towards the tips 113 of the blades.

FIG. 3I shows a configuration of the safety rotor 140 having two looped safety members 141 similar to that of FIGS. 1A and 1B, but with the addition of drag inducer plates 304 on each safety member 141, at its outer portion 143. These drag inducer plates 304 act as aerodynamic drag generators for slowing the rate of rotation of the safety rotor 140. Aerodynamic drag creates a drag torque which counteracts the frictional transmission of torque from the shaft 120 to the safety rotor 140, so that the safety rotor 140 is not allowed to develop the full rotational speed of the shaft 120 but instead revolve at a safer and slower rotational speed.

Finally, FIG. 3J shows an example of a safety rotor 140 having a safety member 141 with significantly different construction compared to the previous examples. In particular, the safety member 141 in this example includes a weighted bob 305 attached to thin threads 306, 307 anchored from the hubs 142, 144. The threads 306, 307 may be formed from highly flexible, non-rigid material, such as cotton thread, and may be pulled taught as these apply a centripetal force on the bob 305 during rotation of the safety rotor 110, so that the safety member 141 can effectively revolve around the shaft 120 without interfering with the flight rotor 110.

In view of the above examples, it will be appreciated that the safety rotor 140 may include a wide range of different configurations of safety members 141 as summarised below.

Some configurations of the safety rotor 140 may include one or more closed loops providing the safety members 141, which may have very wide or very narrow clearance around the flight rotor 110, variable clearance around the flight rotor 110, differing clearance around the top, bottom and/or around the tips 113 of the blades 111 of the flight rotor 110, or a distinct bulge or expansion 303 around the tips 113. Other configurations may include one or more open ended safety members 141 that substantially cover the exposed geometry of the flight rotor 110, which may cover regions above the flight rotor 110 and around the tips 113 of its blades 111, the bottom of the flight rotor 110 and around the tips 113 of its blades 111, only the top or the bottom of the flight rotor 110, or both the top and bottom of the flight rotor 110 but not the tips 113 of its blades 111, or only cover part of the exposed geometry of the flight rotor 110. The safety members 141 may be specifically shaped to avoid collision with the structure of the aircraft, or to avoid collision with an articulated or flexible flapping flight rotor 110.

Some examples of the safety members 141 may be shaped to present a surface easily read by one or more optical sensors, such as optical proximity sensors and photointerruptors. In some examples, the safety members 141 may be provided with a high contrast coloured surface at least in the region detected by an optical sensor. Some forms of the safety members 141 may incorporate one or more reflective elements for triggering an optical sensor, one or more fittings for one or more magnetic, ferro-magnetic or electromagnetic elements for triggering one or more magneto-sensitive proximity sensor such as a Hall-effect device, reed switch or inductive coils, or one or more capacitive structures or surfaces shaped to present one or more surfaces easily read by one or more capacitive proximity sensors.

The safety members 141 may be freely cantilevered, unsupported, or cantilevered with supports. The safety members 141 may be adapted to move with an articulated rotor head for accommodating flapping of the flight rotor 110. In some examples, mechanical material strength maintains the shape of the safety members 141, whereas in other examples, the centripetal force of rotation maintains the shape of the safety members 141, and in some cases the safety members 141 may include loops with a weighted element to act as a mass for centripetal force. In some instance, the shape of each safety member 141 is maintained by a combination of mechanical strength and centripetal force. The safety members 141 may be rigid or elastic, and in some cases made from highly flexible, non-rigid material, such as cotton thread, and may include a solid weight bob or the like. In other cases, the safety members 141 may be formed from a stiff or semi-stiff wire.

The safety rotor 140 may be formed as a single integrated part or can be made from one or more separate components joined together. Safety members 141 may include loops with any of, or any combination of, the following cross-sectional shapes: circular, oval, airfoil, square, rectangular, flat, c-shaped curve, star, diamond, triangle, pentagon, hexagon, V-shaped, L-shaped, cross, T-shaped, sine or wavey-line shaped. In some examples, the cross-sectional shape of the loop is constant along the length of the loop, although in other examples, the cross-sectional shape of the loop may change along the length of the loop.

In some examples, the safety members 130 may include one or more aerodynamic drag generators to slow the rate of rotation. The safety rotor 140 may include one or more hubs 142, 144 for coupling the safety rotor 140 to the shaft 120. The safety rotor 140 may include one or more frictional elements between the hub and the shaft 120 or any intermediate coupling components such as a rotor head of the flight rotor 110, to increase the rate of rotation of the safety rotor 140. The hubs 142, 144 may additionally or alternatively include one or more low-friction bushes, bearings, lubricants or treatments to reduce the transfer of torque from the shaft 120 to the safety rotor 140 and thus slow the rate of rotation and/or increase contact sensitivity.

As mentioned above, the system may be configured so that the safety rotor 140 is rotationally driven by frictional transmission of torque from the shaft 120, which can be increased using a spring. In some examples, a hub 142 of the safety rotor 140 may be mounted on a shaft 120 along with a spring that may be compressed to apply pressure to the hub 142 to thereby cause a surface of the hub 142 to engage with a driven surface that rotates with the shaft 120. In one particular implementation, the spring may be mounted coaxially on the shaft 120, with the spring compressed between a hub 142 of the safety rotor 140 and the flight rotor 11, and the driven surface being a shoulder of the shaft 120. This engagement under the pressure of the spring will result in increased friction for rotationally driving the safety rotor 140 as the shaft 120 rotates. However, the safety rotor 140 may be disengaged when this friction due to the spring pressure is overcome, such as when one of the safety members 141 contacts an object.

In preferred embodiments, the sensor 150 will typically detect the rotation of the safety rotor 140 without requiring any contact between the sensor 150 and any of the safety members 141. For example, the sensor 150 may include an optical sensor, an electromagnetic sensor, a capacitive sensor or a strain sensor. Suitable optical sensors may include optical proximity sensors and photointerruptors. Electromagnetic sensors may include magnetic or ferro-magnetic sensors, Hall-effect sensors, reed switches or inductive coils. In should be appreciated that one or more sensors 150 may be provided, and in the event that a plurality of sensors 150 are used, these may be of the same type or of different types.

In some embodiments, the safety members 141 will be capable of triggering the sensor 150 without requiring any special adaptations. For instance, optical sensors such as optical proximity sensors and photointerruptors may be able to detect the passage of each safety member 141 irrespective of their construction. However, some types of sensors 150 require certain adaptations to the safety members 141 to facilitate proper operation. Accordingly, in some examples, at least one of the safety members 141 may include a trigger element (not shown) for triggering the sensor 150 each time the safety member 141 moves past the sensor 150 during rotation of the safety member 140. In the case of an optical sensor such as optical proximity sensors and photointerruptors, this may involve shaping the safety members 141 to present surfaces that are easily read the optical sensors 150. Other types of optical sensors may be used to detect light reflected from a reflective element provided on one or more of the safety members 141.

In some examples, safety members 141 may include one or more fittings for one or more magnetic, ferro-magnetic or electromagnetic elements for triggering magneto-sensitive proximity sensors such as a Hall-effect device, reed switch or inductive coils. In other examples, safety members 141 may include one or more capacitive structures or surfaces shaped to present one or more surfaces easily read by capacitive proximity sensors.

It should be noted that whilst the above discussion assumes that the sensor 150 detects movement of the safety member 141 past the sensor 150, other embodiments may be provided in which the sensor 150 is adapted to detect rotation of one of the hubs 142, 144, such as by using a rotary encoder or the like. In the case of systems 100 including two hubs 142, 144, the sensor 150 could be conveniently provided for detecting rotation of the second hub 144 located closest to the drive 130.

In any event, it will be appreciated that the particular selection of the type of sensor 150 and any corresponding adaptations to the safety members 141 will not be critical to the overall functionality of the system, provided the sensor 150 is capable of reliably detecting the rotation of the safety rotor 140 so as to provide a suitable signal to the controller 160, for use in determining when the safety rotor 140 has encountered an object based on a decrease in its rotational speed.

The controller 160 may be configured to implement its safety functions in a range of different ways. Typically, the controller 160 will at least cause the drive 130 to cease its rotation of the shaft 120, such as by switching off the drive 130, although in some embodiments the controller 160 may implement active measures for ceasing the rotation of the shaft 120. The controller 160 may be specifically adapted to work with a drive 130 in the form of an electric motor, especially a brushless DC motor, although the controller 160 may also be configured to work with other types of drives 130 including combustion engines.

In the event that the drive 130 is provided in the form of an electric motor, the controller 160 may be configured to cause the electric motor to apply electro-dynamic braking to the shaft 120 in response to detecting the decrease in rotational velocity of the safety rotor 140. Accordingly, this can be used to stop the rotation of the shaft 120 more rapidly than would be possible simply by cutting power to the electric motor and allowing the shaft 120 and flight rotor 110 to come to a stop naturally.

In another example, the system 100 may include a braking device (not shown), such as a disc brake or drum brake, coupled to the shaft 120 and the controller 160 may be configured to cause the braking device to apply a braking force to the shaft 120 in response to detecting the decrease in rotational velocity of the safety rotor 140. It will be appreciated that this can also be used to achieve more rapid stopping rotation of the shaft 120 as discussed above, and may be particularly useful for non-electric drives 130 or to supplement or replace the electro-dynamic braking of electric motor drives 130.

Typically, the controller 160 will be provided in a safety circuit or electronic speed controller (ESC) circuit for controlling the operation of the drive 130 based on the sensor 150 input and optionally other control signals received from the aircraft avionics. The controller 160 may be integrated with a processing device of the aircraft for controlling operation of the drive 130 or alternatively, may be provided using a separate microcontroller which can override the control of the drive 130 when implementing its safety functions.

In some examples, the controller 160 may be configured to intercept instructions sent to a separate electronic speed controller and replace those instructions with signals that command the electronic speed controller to turn off and/or brake the motor.

The controller 160 may be connected to a data channel and/or network such that a reset instruction may be sent to it, allowing the safety function to be disabled and the flight rotor 110 to be operated normally once again.

In some embodiments in which more than one flight rotor 110 is used together in an aircraft, each flight rotor 110 may have its own safety rotor 140, sensor 150 and controller 160. When the rotational velocity of any of the safety rotors 140 decreases sufficiently for the controller 160 to activate its safety functions, the controller 160 communicates over a data channel and/or network so that one, some or all other controllers receive notification of the safety function activation, whereupon they activate their safety function and stop their respective flight rotors 110.

Alternatively, in other embodiments in which more than one flight rotor 110 is used together in an aircraft, each flight rotor 110 may have its own safety rotor 140 and sensor 150, whilst a single controller 160 may be provided which monitors signals generated by two or more of the sensors 150 and carries out the safety functions for the corresponding flight rotors 110.

In one example implementation including multiple flight rotors 110 having respective safety rotors 140 and sensors 150, the controller(s) 160 may be configured so that when deceleration of one safety rotor 140 is detected (indicating an object approaching a corresponding flight rotor 110), safety functions are activated for one or more other safety rotors 140. Accordingly, sensed events involving a safety rotor 140 colliding with an object can be cross-fed to trigger deactivation of multiple flight rotors 110.

Some examples may involve sophisticated strategies for selectively triggering safety functions across multiple flight rotors 110 depending on particular sensed events. For instance, on a hex-rotor aircraft, if a single safety rotor 140 is triggered, safety functions may only be activated for the corresponding flight rotor 110 and the remaining flight rotors 110 will remain active. However, if a second safety rotor 140 is triggered, then all flight rotors may be halted by the safety functions.

In other embodiments, a single safety rotor 140 may be provided for enhancing the safety of multiple flight rotors 110. The safety rotor 140 may be coupled to its own shaft 120 that is separate from the respective flight rotor shafts of the flight rotors 110, with the sensor 150 mounted on the shaft 120 of the safety rotor 140. A safety rotor drive may be used to rotationally drive the shaft 120 when the flight rotor shafts are being rotationally driven by respective drives 130. The safety rotor 140 may have safety members 141 configured to traverse a path outward of each of the multiple flight rotors 110. For instance, in a typical quadrotor aircraft in which flight rotors 110 are positioned at outer quadrants of the aircraft, the single safety rotor 140 may be located in a central position with respect to the flight rotors 110, and have safety members 141 which extend across the respective rotor discs of each flight rotor to thereby provide its safety functionality with respect to all of the flight rotors 110. The controller 160 may be adapted to cease the drives 130 of all of the flight rotors 110 when an object contacts one of the safety members 141 and causes deceleration of the safety rotor 110.

In some embodiments, the controller 160 may be integrated with a flight control system which controls the flight of the aircraft so that the controller 160 may cause the aircraft to change its motion away from the object to avoid a major collision.

For instance, in the case of a quadrotor aircraft, each of the four flight rotors 110 may have its own safety rotor 140 and sensor 150 which generates signals and provides these to the integrated controller 160 and flight control system. When an object is encountered by one of the safety rotors 140, the respective flight rotor 110 may be disabled to prevent damaging contact with the respective flight rotor 100 and the three remaining flight rotors 110 may remain active and be controlled to cause the aircraft to manoeuvre away from the safety rotor 140 that came into contact with the object, to thereby prevent further contact. The disabled flight rotor 110 may be automatically restarted when the aircraft retreats from the object by a predetermined distance.

An example of a specific configuration of the system 100 will now be described, once again with regard to the embodiment depicted in FIGS. 1A and 1B.

In this example, the flight rotor 110 is provided using a standard hobby rotor mounted on a shaft 120 of a drive 130 that is provided using a standard brushless DC electric motor. A custom spinner 114 with a metal spindle 112 is mounted on the shaft 120. The safety rotor 140 is formed as a lightweight moulded plastic component including two safety members 141 in the form of thin loops around the flight rotor 110. The safety rotor 140 bears on the spindle 112, which is fixed to rotate with the flight rotor 110.

When the flight rotor 110 is energized by the drive 130 turning the shaft 120, the spindle 112 transmits torque to the safety rotor 140 by friction, causing it to rotate. In particular, the safety rotor 140 is mounted on the metal spindle 112 using a low-friction bearing in its hub 142, which allows the safety rotor 140 to be driven by friction on the shaft 120 and stop when it contacts an obstacle. The transmission of torque between the spindle 112 and the safety rotor 140 is sufficiently low such that the safety rotor 140 does not spin as fast as the flight rotor 110. In this example, bearing friction between the spindle 112 and the safety rotor 140 transmits torque force to the safety rotor 140, and the drag torque of the safety rotor 140 rotating through the air prevents it from obtaining the same high speed as the flight rotor 110.

As the safety rotor 140 rotates, the sensor 150 measures its rotational velocity. In this example, the sensor 150 is provided using an optical proximity sensor which is positioned so that a part of the safety rotor 140, specifically a lower part of the loop of a safety member 141, passes within range of the sensor 150 with each rotation, allowing the speed of rotation of the safety rotor 140 to be reliably detected. The sensor 150 may detect a reflective patch on the bottom of each safety member 141 as they pass the sensor, and the rotational velocity may be determined by measuring the period between detections.

When the system 100 is brought towards an object, or an object is moved towards the system 100, the object may impinge on the rotation of the safety rotor 140, changing its rotational velocity. The safety rotor 140 has very lightweight construction so that it can be immediately stopped by any contact without transferring sufficient energy to harm a human by the impact with the safety rotor 140.

When the controller 160 determines that the rotational velocity of the safety rotor 140 has decreased by an amount that is greater than an amount permitted by one or more analytical rules, the controller 160 will activate its safety function. The analytical rules may include comparing the decrease in rotational velocity with a fixed maximum negative change in velocity threshold.

In this example, the controller 160 is provided in the form of a safety circuit which includes a microcontroller 161 configured to process signals from the sensor 150 to monitor the speed of rotation of the safety rotor 140. When the microcontroller 161 detects a decrease of the rotational velocity of the safety rotor 140, the microcontroller 161 responds by activating safety functions to slow and stop the electric motor and in turn the flight rotor 110. The safety circuit of the controller 160 engages to immediately decelerate the shaft 120 and thus the flight rotor 110 so that it is harmless by the time the object would touch it. The controller 160 works with the brushless DC motor by disengaging field effect transistors (FETs) 162 connecting the motor to a positive power supply rail, and also shorts the phases of the brushless DC motor together to employ electro-dynamic braking.

It will be appreciated that the elements of the system 100 may be separate stand-alone components or integrated with other components typically found in aircraft rotor drive systems. For example, the safety circuitry providing the controller 160 may be contained within its own printed circuit board, or may be incorporated into the functionality of an electronic speed controller, and similarly the spindle 112 may be a separate bearing device, or could be incorporated into a rotor spinner attachment used to hold the flight rotor 110 onto the motor shaft 120.

Another example embodiment of a safety rotor system 400 will now be described with regard to FIGS. 4A and 4B, which depict an assembled view and an exploded view of the system 400, respectively.

It will be appreciated that this embodiment of the system 400 has a similar overall configuration as the embodiment of FIGS. 1A and 1B, and accordingly, the same reference numerals have been used to indicate the same features in the two embodiments. In general, the system 400 has the same functionality as the above described example of the system 100.

The key differences between the embodiment of the system 400 and the previously described embodiment relate to the particular arrangement for coupling the safety rotor 140 to the shaft 120. In particular, the safety rotor 140 is coupled to the shaft 120 along with a spring 401 which is used to bias the hub 144 of the safety rotor 140 towards a shoulder 122 of the shaft 120 to thereby provide increased friction due to pressure applied to the hub 144.

Figure 4A:
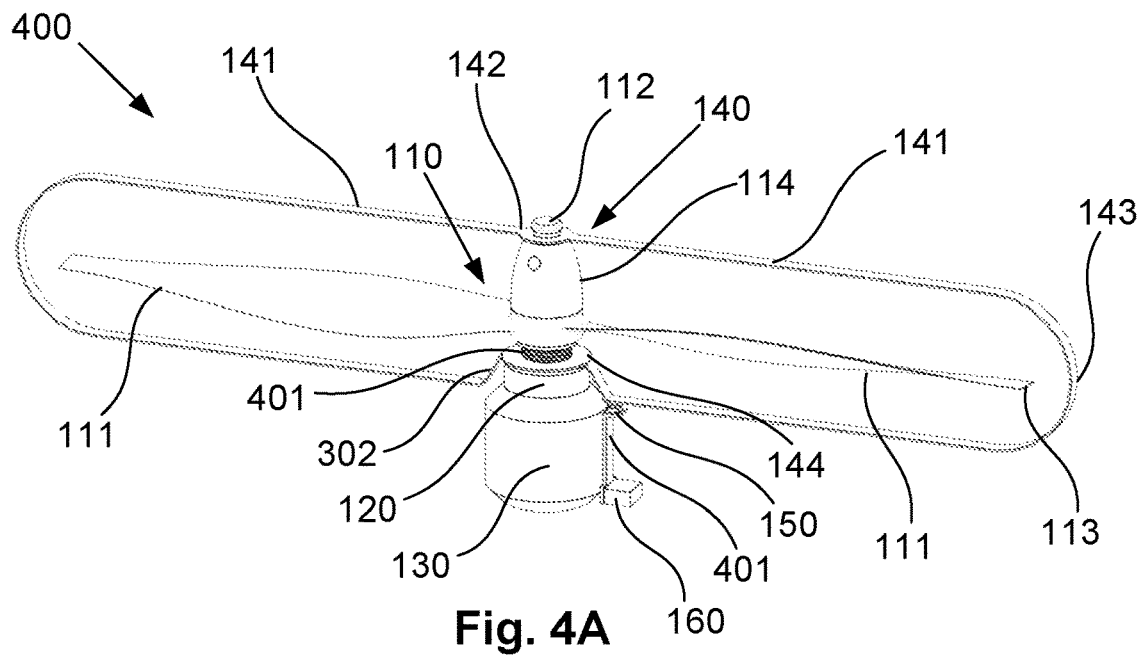
FIG. 4A is a perspective view of another example of a safety rotor system for an aircraft; and, FIG. 4B is an exploded view of the safety rotor system of FIG. 4A.
Figure 4B:
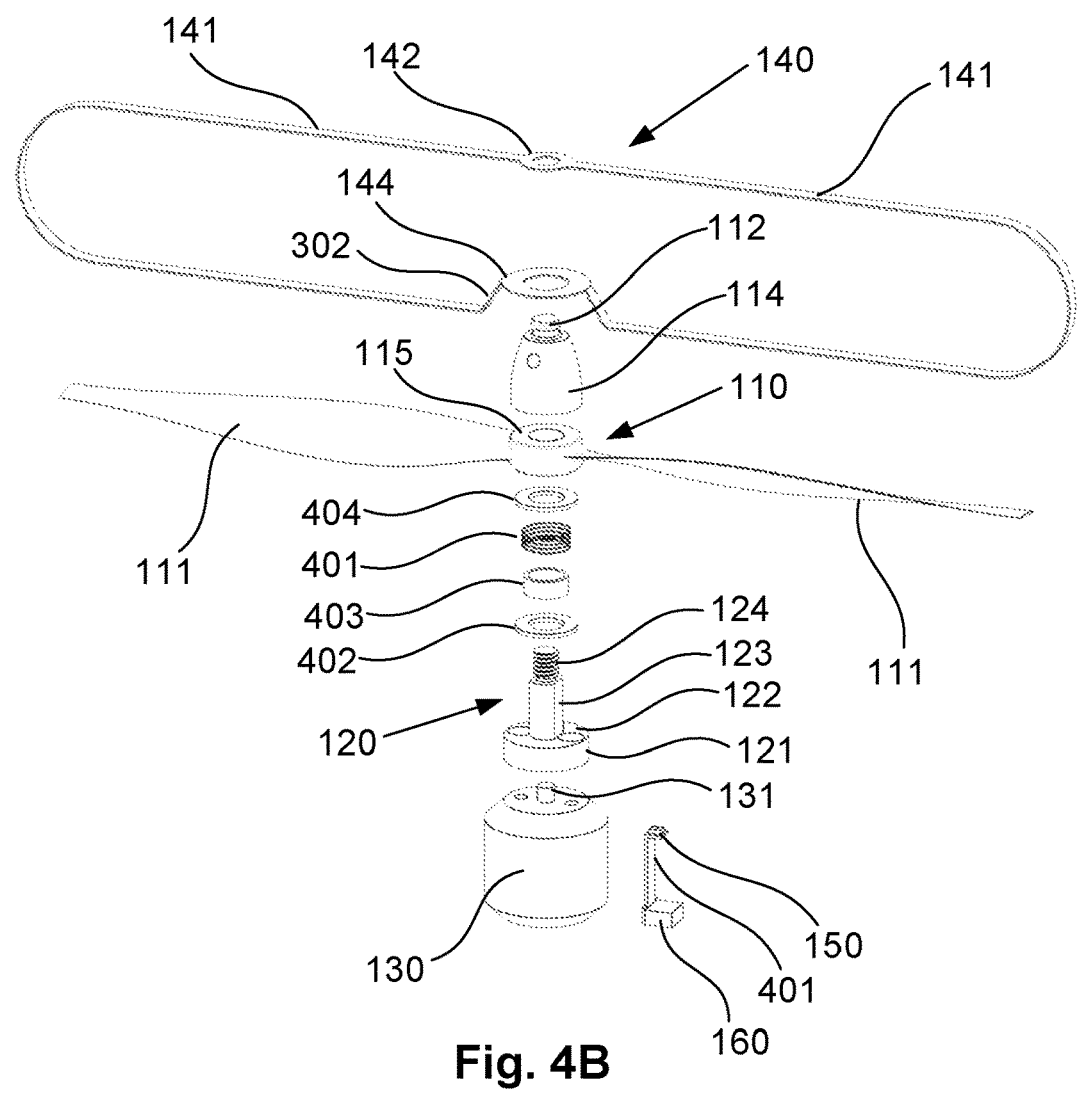

Further details of this coupling arrangement may be better appreciated with reference to the exploded view of FIG. 4B. The shaft 120 includes a base 121 which is mounted on a stub shaft 131 of the drive 130, such that the shaft 120 will be rotationally driven by the drive 130 in use. The base 121 defines a shoulder 122 facing away from the drive 130 and a flattened shaft portion 123 extends from the base 121 in a coaxial relationship with the stub shaft 131. A threaded shaft portion 124 is provided at a distal end of the shaft 120.

The rotating elements of the system 400 are arranged as follows. As mentioned previously, the base 121 of the shaft 120 is mounted on the stub shaft 131 of the drive 130. A First washer 402 is installed on the flattened shaft portion 123 resting on the shoulder 122 of the shaft 120 and a sleeve 403 is installed on the flattened shaft portion 123 in turn so that the sleeve 403 rests on the first washer 402. The hub 144 is installed over the sleeve 403 so that a first surface of the hub 144 facing towards the drive 130 also rests on the first washer 402. The spring 401 is also installed over the sleeve 403 resting on a second surface of the hub 144 facing away from the drive 130 and a second washer 404 is then installed on the flattened shaft portion 123. Accordingly, the sleeve 403, hub 144 and spring 401 will be sandwiched between the two washers 402, 404.

The flight rotor 110 may then be installed on the flattened shaft portion 123. In this example, the flight rotor 110 has a flight rotor hub 115 which includes a hole having internal flattened regions that compliment the shape of the flattened shaft portion 123 so that the flight rotor hub 115 is positively engaged by the flattened shaft portion 123 to thereby allow the flight rotor 110 to be rotationally driven by the shaft 120. A spinner assembly 114 including a spindle 112 is then threadingly connected to the threaded shaft portion 124 to thereby retain the flight rotor 110 in place on the shaft 120. Finally, the other hub 142 of the safety rotor 140 is mounted on the spindle 112.

It will be appreciated that the practical installation of the above discussed elements may not necessarily follow the sequence described above. For example, a partial assembly of the safety rotor 140, the spinner assembly 114, the flight rotor 110 the two washers 402, 404, the sleeve 403 and the hub 144 may be initially formed and the shaft 120 may be inserted through their collective holes. However, if the safety rotor 140 is installed on the shaft 120 before the other elements, it may be necessary to flexibly deform the safety members 141 to displace the hub 144 sufficiently to allow the spinner assembly 114 to be installed with the hub 142 mounted on the spindle 112.

Although the flight rotor hub 115 is positively engaged by the flattened shaft portion 123, the other hardware installed on the flattened shaft portion 123, including the two washers 402, 404, the sleeve 403 and the hub 144 each have circular shaped holes and therefore are not positively engaged by the flattened shaft portion 123. However, the coupling arrangement is designed so that when all of the elements are correctly installed on the shaft 120, the spring 401 will be compressed such that the spring 401 applies pressure to the hub 144 that effectively causes the hub 144 to be frictionally engaged by the shaft 120.

Accordingly, when the shaft 120 is driven by the drive 130 to rotationally drive the flight rotor 110, the safety rotor 140, being frictionally engaged by the shaft 120 by virtue of the pressure applied by the spring 401, will also be rotationally driven by the shaft 120. However, if one of the safety members 141 contacts an object, the frictional engagement may be overcome and the hub 144 may be permitted to slip relative to the shaft 120, such that the safety rotor 140 will be permitted to decelerate and thus trigger the above discussed safety functionalities in which the controller 160 responds to the deceleration by ceasing rotation of the flight rotor 110.

It will be appreciated that alternative embodiments may be provided which operate based on a similar principle of frictional engagement due to spring pressure, yet with different coupling arrangements including different configurations of the shaft 120 and elements associated with the spring 401.

It is also noted that the safety rotor 140 shown in FIGS. 4A and 4B include a further example of recesses 302 adjacent to the hub 144 as previously described with regard to FIG. 3F. It will be appreciated that the recesses 302 allow for a more compact installation without reducing the separation between the safety members 141 of the safety rotor 140 and the blades 111 of the flight rotor 110, since the recesses 302 accommodate the structure of drive 130.

The system 400 of FIGS. 4A and 4B also includes an example physical arrangement of the controller 160 and sensor 150. In this case the controller 160 and the sensor 150 are mounted on opposing ends of a bracket 401 which can be coupled to the drive 130 (or other supporting structure adjacent to the drive 130). The sensor 150 may be mounted on an end of the bracket that positions the sensor 150 proximate to the path traversed by the safety members 141, so that the sensor 150 will be triggered each time a safety member 141 rotates past the sensor 150. The controller 160 may be mounted on an opposing end of the bracket so that the controller 160 can be located away from the rotating elements of the system 400. In the event that the drive 130 is an electric motor, the controller 160 may be located proximate to wiring terminals of the electric motor, and may be coupled to the wiring terminals to allow direct control of the electric motor operation, if desired.

In summary, the system 100 uses a safety rotor 140 that rotates around the same axis as the flight rotor 110, but with a separation from the blades 111. The safety rotor 140 typically rotates at a rate that is fast enough to rapidly traverse 360 degrees around the flight rotor 110, but not so fast that its rotation is itself hazardous, so that it traverses a swept surface around the blades 111. A sensor 150 can measure the speed of the safety rotor 140 as it spins, and when the safety rotor 140 touches an object (e.g. a person's hand) it slows down or stops without imparting substantial energy, but its change in speed is detected by the sensor 150, indicating an imminent collision with the flight rotor 110. A controller 160 then engages to immediately decelerate the flight rotor 110 so that it is substantially harmless by the time the object would touch it, or else change the motion of the aircraft away from the object to avoid a major collision.

It will be appreciated that the safety rotor system 100 can significantly increase the safety of spinning blades and propellers used in aircraft, and may be easily added to existing hobby quadrotors or the like. The weight penalty is negligible, and may be less than 20g in small hobby drone application.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A safety rotor system for an aircraft including a flight rotor that is rotationally driven by a drive, the system including:
   a) a safety rotor that is rotationally driven during rotation of the flight rotor, the safety rotor including one or more safety members traversing a path outward of the flight rotor so that an object approaching the flight rotor through the path contacts one of the safety members before contacting the flight rotor, wherein the safety rotor decelerates when one of the safety members contacts an object;
   b) a sensor for detecting rotation of the safety rotor; and,
   c) a controller configured to:
      i) determine, using the sensor, a deceleration of the safety rotor corresponding to one of the safety members contacting an object; and,
      ii) cause the rotation of the flight rotor to cease in response to detecting the deceleration of the safety rotor.

2. A system according to claim 1, wherein the path is radially outward of the flight rotor.

3. A system according to claim 1, wherein the path defines a swept surface covering at least a portion of a rotor disc defined by the flight rotor so that an object passing through the swept surface contacts one of the safety members before contacting the flight rotor.

4. A system according to claim 3, wherein each safety member is configured so that at least one of:
   a) the swept surface covers at least one of:
      i) a side of the rotor disc;
      ii) an edge of the rotor disc; and,
      iii) both sides of the rotor disc; and,
   b) the swept surface substantially encloses the rotor disc.

5. A system according to claim 1, wherein the safety rotor is coupled to a shaft using a coupling that allows the safety rotor to be rotationally driven during rotation of the shaft, the coupling permitting the safety rotor to decelerate relative to the shaft when one of the safety members contacts an object.

6. A system according to claim 5, wherein the flight rotor is mounted on the shaft, the shaft being rotationally driven by the drive.

7. A system according to claim 5, wherein the shaft is rotationally driven by a safety rotor drive separate from the drive for driving the flight rotor and the flight rotor is mounted on a flight rotor shaft separate from the shaft to which the safety rotor is coupled, the flight rotor shaft being rotationally driven by the drive.

8. A system according to claim 7, wherein the controller is configured to cause the safety rotor drive to rotate when the drive is driving the flight rotor shaft.

9. A system according to claim 5, wherein the coupling allows the safety rotor to be rotationally driven by a frictional transmission of torque from the shaft and permits the safety rotor to slip relative to the shaft when one of the safety members contacts an object.

10. A system according to claim 9, wherein the coupling includes a spring for biasing a safety rotor surface into engagement with a driven surface such that the frictional transmission of torque is increased due to spring pressure.

11. A system according to claim 10, wherein the spring is mounted coaxially on the shaft, the spring being compressed between a hub of the safety rotor and the flight rotor, and the driven surface being a shoulder of the shaft.

12. A system according to claim 5, wherein the safety rotor includes a hub for coupling the safety rotor to the shaft, each safety member being connected to the hub.

13. A system according to claim 12, wherein at least one of:
   a) each safety member extends radially from the hub beyond an edge of a rotor disc defined by the flight rotor,
   b) each safety member includes an outer portion extending at least partially around the edge of the rotor disc; and, c) the hub and the one or more safety members are formed integrally.

14. A system according to claim 12, wherein the safety rotor includes a first hub for coupling the safety rotor to the shaft on a first side of the flight rotor and a second hub for coupling the safety rotor to the shaft on an opposing second side of the flight rotor, each safety member being connected to the first hub and the second hub.

15. A system according to claim 14, wherein one of the hubs is used to rotationally drive the safety rotor during rotation of the shaft and the other one of the hubs is rotationally decoupled from the shaft.

16. A system according to claim 14, wherein each safety member defines a closed loop extending around the rotor disc between the first hub and the second hub, each safety member being configured to maintain a minimum clearance distance between the loop and the rotor disc during rotation of the shaft.

17. A system according to claim 5, wherein at least one of:
   a) the drive is an electric motor and the controller is configured to cause the electric motor to apply electrodynamic braking to the shaft in response to detecting the decrease in rotational velocity of the safety rotor; and,
   b) the system includes a braking device coupled to the shaft and the controller is configured to cause the braking device to apply a braking force to the shaft in response to detecting the decrease in rotational velocity of the safety rotor.

18. A system according to claim 1, wherein each safety member is one of:
   a) sufficiently rigid so that a shape of the safety member at rest is substantially maintained during rotation; and,
   b) flexible so that the safety member adopts a different shape during rotation compared to a shape of the safety member at rest.

19. A system according to claim 1, wherein the sensor includes at least one of:
   a) an optical sensor;
   b) an electromagnetic sensor;
   c) a capacitive sensor; and,
   d) a strain sensor.

20. A system according to claim 1, wherein at least one of:
   a) at least one of the safety members includes a trigger element for triggering the sensor each time the safety member moves past the sensor during rotation; and,
   b) the controller is integrated with a processing device of the aircraft that controls operation of the drive.

* * * * *